United States Patent
Jin et al.

(10) Patent No.: US 8,224,119 B2
(45) Date of Patent: *Jul. 17, 2012

(54) SELECTING A REFERENCE IMAGE FOR IMAGES TO BE JOINED

(75) Inventors: Hailin Jin, Campbell, CA (US); Jen-Chan Chien, Saratoga, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/198,636

(22) Filed: Aug. 4, 2011

(65) Prior Publication Data

US 2011/0286684 A1    Nov. 24, 2011

Related U.S. Application Data

(63) Continuation of application No. 11/639,048, filed on Dec. 13, 2006, now Pat. No. 7,995,861.

(51) Int. Cl.
*G06K 9/00*    (2006.01)
(52) U.S. Cl. ............... 382/284; 382/294; 345/629
(58) Field of Classification Search .............. None
See application file for complete search history.

(56) References Cited

U.S. PATENT DOCUMENTS

| | | | |
|---|---|---|---|
| 5,987,164 A * | 11/1999 | Szeliski et al. ............ 382/154 |
| 6,011,558 A | 1/2000 | Hsieh et al. | |
| 6,075,905 A | 6/2000 | Herman | |
| 6,181,832 B1 | 1/2001 | Maas, III | |
| 6,201,541 B1 | 3/2001 | Shalom et al. | |
| 6,249,616 B1 | 6/2001 | Hashimoto | |
| 6,424,752 B1 | 7/2002 | Katayama et al. | |
| 6,714,689 B1 | 3/2004 | Yano et al. | |
| 6,788,333 B1 | 9/2004 | Uyttendaele | |

(Continued)

FOREIGN PATENT DOCUMENTS

WO    2006/002796    1/2006

OTHER PUBLICATIONS

Autopano.net, "Key Features: Automatic Stitching, Color Correction, HDR—Autopano Pro Website", 2005, retrieved from the internet at http://www.autopane.net/key-features on Dec. 8, 2006, 3 pages.

(Continued)

*Primary Examiner* — Bhavesh Mehta
*Assistant Examiner* — Barry Drennan
(74) *Attorney, Agent, or Firm* — Fish & Richardson P.C.

(57) ABSTRACT

The present disclosure includes systems and techniques relating to selecting a reference image for images to be joined in accordance with projective transformations. In general, one aspect of the subject matter described in this specification can be embodied in a computer-implemented method that includes obtaining projective transformations corresponding to two dimensional images to be joined together in accordance with the projective transformations; selecting one of the two dimensional images to be a reference image for remaining ones of the two dimensional images, the selecting being based on a measure of overall distortion for the two dimensional images; setting a projective transformation of the one of the images according to a group transform; correcting remaining projective transformations of the remaining images in accordance with the setting the projective transformation of the one of the images; and making the two dimensional images and the projective transformations available for further processing and output.

31 Claims, 10 Drawing Sheets

U.S. PATENT DOCUMENTS

| | | | |
|---|---|---|---|
| 7,103,236 B2 | 9/2006 | Peterson | |
| 7,127,125 B2 * | 10/2006 | Perlmutter et al. | 382/294 |
| 7,256,799 B2 * | 8/2007 | Hatanaka et al. | 345/629 |
| 2003/0076361 A1 | 4/2003 | Hatanaka et al. | |
| 2003/0184778 A1 | 10/2003 | Chiba | |
| 2007/0031063 A1 | 2/2007 | Zhou | |
| 2008/0247667 A1 | 10/2008 | Jin et al. | |

OTHER PUBLICATIONS

Autostitch™:: "A new dimension in automatic image stitching", Nov. 3, 2006, retrieved from the internet at http://www.cs.ubc.ca/~mbrown/autostitch/autostitch.html, on Dec. 8, 2006, pp. 1-8.

Bancila, "Getting Acquainted with the Microsoft Expression Family", Jun. 9, 2006, retrieved from the internet at http://www.codeguru.com/csharp/csharp/cs_misc/userinterface/article.php/c12079__1, on Nov. 27, 2006, 10 pages.

Brown, M., et. al., "Recognising Panoramas," Oct. 2003, Proceedings of the Ninth IEEE International Conf. on Computer Vision, pp. 1218-1225, ICCV 2003, 8 pages.

Cormen, T. H., et. al., "Introduction to Algorithms," 1990, Chapter 26, Section 2, pp. 558-565.

David, M., "Is Microsoft Expression Graphic Designer Good Enough to Take on Adobe Illustrator?", Oct. 14, 2005, retrieved from the internet at http://www.informit.com/articles/article.asp?p=418861&seqNum=3&rl=1 , on Dec. 8, 2006, pp. 1-3.

Kang, et al. "A Graph-Based Global Registration for 2D Mosaics", Proceedings of the 15th International Conference on Pattern Recognition, vol. 1, Sep. 3, 2000, pp. 257-260.

Kim et al. (Apr. 2006) "Real-time mosaic using sequential graph." J. Electronic Imaging, vol. 15 No. 2, pp. 023005-1 to 023005-13.

Lubach, "International Search Report and Written Opinion", European Patent Office, PCT/US2007/087302 dated May 9, 2008, 10 pages.

Marzotto et al. (Jul. 2004) "High resolution video mosaicing with global alignment." Proc. 20047 IEEECS Conf. on Computer Vision and Pattern Recognition, vol. 1 pp. 692-698.

Sawhney et al. (Jun. 1998) "Robust video mosaicing through topology inference and local to global alignment." $5^{th}$ European Conf. on Computer Vision, vol. II pp. 103-119 (LNCS vol. 1407).

SERIF, "PanoramaPlus", 1987-2006, retrieved from the internet at http://www.serif.com/panoramaplus/panoramaplus2/index.asp, on Dec. 8, 2006, pp. 1-2.

Stitcher® 5 for Macintosh® and Windows® Tutorial, REALVIZ S.A., pp. 1-22, Sep. 2005.

Szeliski, R., et. al., Creating Full View Panoramic Image Mosaics and Environment Maps, Computer Graphics (SIGGRAPH'97 Proceedings), pp. 251-258, Aug. 1997.

* cited by examiner

SELECTING A REFERENCE IMAGE FOR IMAGES TO BE JOINED

CROSS REFERENCE TO RELATED APPLICATIONS

This application is a continuation application and claims the benefit of priority (under 35 USC 120) of U.S. application Ser. No. 11/639,048, filed Dec. 13, 2006, now U.S. Pat. No. 7,995,861, issued on Aug. 9, 2011, which is incorporated by reference herein.

BACKGROUND

The present disclosure relates to image processing techniques and tools for stitching together two dimensional images.

Image capture devices, such as cameras, can be used to capture an image of a section of some larger view, and such image capture devices can have a field of view that is less than desired. Thus, to generate an image of the larger view, multiple overlapping images of sections of the view can be taken, and the images can be stitched together to form a composite image, which may sometimes be referred to as a panoramic image. An image captured by a camera often distorts the sizes of objects depicted in the image so that distant objects appear smaller than closer objects. The size distortion, which is known as perspective distortion, depends on the camera position, the pointing angle of the camera, and so forth. Consequently, an object depicted in two different images might not have the same size in the two images, because of perspective distortion.

Different image stitching software tools are available, including commercial products and free software available over the Web. These image stitching software tools include tools that require user input to establish a reference image for a set of images, tools that automatically select a reference image based on a fixed ordering to the images (i.e., the first image in the set can be taken as the reference image), and tools that automatically select a reference frame, which is not locked to any specific image. Recently, automatic image stitching, i.e. image stitching with no user interaction, has become feasible and popular, thanks to advances in computer vision techniques. Given a set of images, there is software that can return a set of projective transformations that, when applied to the images, allows the images to be joined together in a composite image in a seamless, or nearly seamless manner.

A projective transformation is generally a nonlinear, two dimensional transformation that is conservative in terms of cross-ratios. A projective transformation can be represented with a 3×3 real non-singular matrix $$P = \begin{bmatrix} p_{11} & p_{12} & p_{13} \\ p_{21} & p_{22} & p_{23} \\ p_{31} & p_{32} & p_{33} \end{bmatrix}.$$

Given a point with coordinates $x = [x_1, x_2]$, the transformed coordinates are given by $$y = [y_1, y_2] = \left[ \frac{(p_{11}x_1 + p_{12}x_2 + p_{13})}{(p_{31}x_1 + p_{32}x_2 + p_{33})}, \frac{(p_{21}x_1 + p_{22}x_2 + p_{23})}{(p_{31}x_1 + p_{32}x_2 + p_{33})} \right]$$

The identity transformation can be represented with the 3×3 identity matrix $$P = \begin{bmatrix} 1 & 0 & 0 \\ 0 & 1 & 0 \\ 0 & 0 & 1 \end{bmatrix}$$

and is a special projective transformation that, when applied to an image, results in the same image.

SUMMARY

This specification describes technologies relating to selecting a reference image for images to be joined in accordance with projective transformations. In general, one aspect of the subject matter described in this specification can be embodied in a computer-implemented method that includes obtaining projective transformations corresponding to two dimensional images to be joined together in accordance with the projective transformations; selecting one of the two dimensional images to be a reference image for remaining ones of the two dimensional images, the selecting being based on a measure of overall distortion for the two dimensional images; setting a projective transformation of the one of the images according to a group transform; correcting remaining projective transformations of the remaining images in accordance with the setting the projective transformation of the one of the images; and making the two dimensional images and the projective transformations available for further processing and output. Other embodiments of this aspect include corresponding systems, apparatus, and computer program products.

These and other embodiments can optionally include one or more of the following features. The selecting can include estimating which of the two dimensional images minimizes the measure of overall distortion for the two dimensional images when used as a reference. The estimating can include finding an image in the two dimensional images with a minimum maximal distance to overlapping images in the two dimensional images. The finding can include forming a graph having nodes representing the overlapping images in the two dimensional images, and locating a center node within the graph, the center node corresponding to the image in the two dimensional images with the minimum maximal distance to the overlapping images in the two dimensional images.

The selecting can include determining an optimal reference image, for the two dimensional images, that minimizes the measure of overall distortion for the two dimensional images. The determining can include calculating, for each image in the two dimensional images being treated as a given reference image, distortions for remaining ones of the two dimensional images, the distortions resulting from the given reference image having its projective transformation set according to a group transform; deriving a group distortion measure from the calculated distortions, for each image in the two dimensional images being treated as the given reference image, thereby obtaining multiple group distortion measures; and finding a minimum value in the multiple group distortion measures. Moreover, the deriving can include taking a maximum value of the calculated distortions as the group distortion measure.

The selecting can include calculating distortion of a current image based on enclosing areas of the current image both before and after application of a current projective transformation. The calculating can include calculating a first enclosing area of the current image before application of the current projective transformation; calculating a second enclosing area of a bounding box of the current image after application of the current projective transformation; calculating a third enclosing area of the current image after application of the current projective transformation; and deriving the distortion of the current image from the first enclosing area, the second enclosing area, and the third enclosing area.

The selecting can include obtaining an indication of a preferred reference image; modifying the projective transformations in accordance with the preferred reference image; assessing the measure of overall distortion based on the modified projective transformations; and alerting a user regarding excessive distortion in the two dimensional images when the measure of overall distortion for the two dimensional images, in view of the modified projective transformations, exceeds a threshold. The alerting can include suggesting an alternative reference image.

The selecting can include determining the alternative reference image by estimating which of the two dimensional images minimizes the measure of overall distortion for the two dimensional images when used as a reference. The selecting can include determining the alternative reference image by determining an optimal reference image, for the two dimensional images, that minimizes the measure of overall distortion for the two dimensional images. The selecting can include determining the alternative reference image including calculating distortion of a current image based on enclosing areas of the current image both before and after application of a current projective transformation. Moreover, the selecting can include setting the threshold based on the alternative reference image.

The above methods can be implemented in various systems, apparatus, and computer program products. For example, a system can include a user interface device, and one or more computers operable to interact with the user interface device and to perform the method operations described. The one or more computers can include a server operable to interact with the user interface device through a data communication network, and the user interface device can be operable to interact with the server as a client. The user interface device can include a personal computer running a web browser, a mobile telephone running a WAP (Wireless Application Protocol) browser, etc. Moreover, the one or more computers can include one personal computer, which can include the user interface device.

Particular embodiments of the subject matter described in this specification can be implemented to realize one or more of the following advantages. A visually pleasant layout for a set of images stitched together under projective transformations can be automatically computed, while at the same time, user input can be respected, and a warning can be provided to the user their choices are not ideal. The warning can be provided before the images are actually distorted based on a user's selected reference image, which can avoid potential problems that may arise when applying an inappropriate choice of reference image (e.g., when a selected reference image causes other images to be distorted so much that something drastic happens, such as running out of memory space when applying a projective transformation).

The visually pleasant layout can be determined by finding the image that, when fixed as a non-transformed reference image, minimizes the distortion of the remaining images, in accordance with projective transformations generated by automatic image alignment software. Forcing one of the images to be a reference image, which is not transformed (separate from any universal transform for the set of images), can result in an improved visual appearance for the composite image since one of the images in the set to be joined is often the most interesting one, and keeping such an image undistorted can improve the overall appearance of the joined images.

The user experience of image stitching can be enhanced. The user can be free to explicitly specify a reference image. However, if the user does not specify a reference image, an appropriate image in the set can automatically be chosen as the reference image. Moreover, when the user does specify a reference image, the resulting composition under this choice can be automatically checked to see if it causes large distortion for other images in the set. If the distortions are large, the user can be warned, and the automatically computed reference image can be suggested as an alternative reference image.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
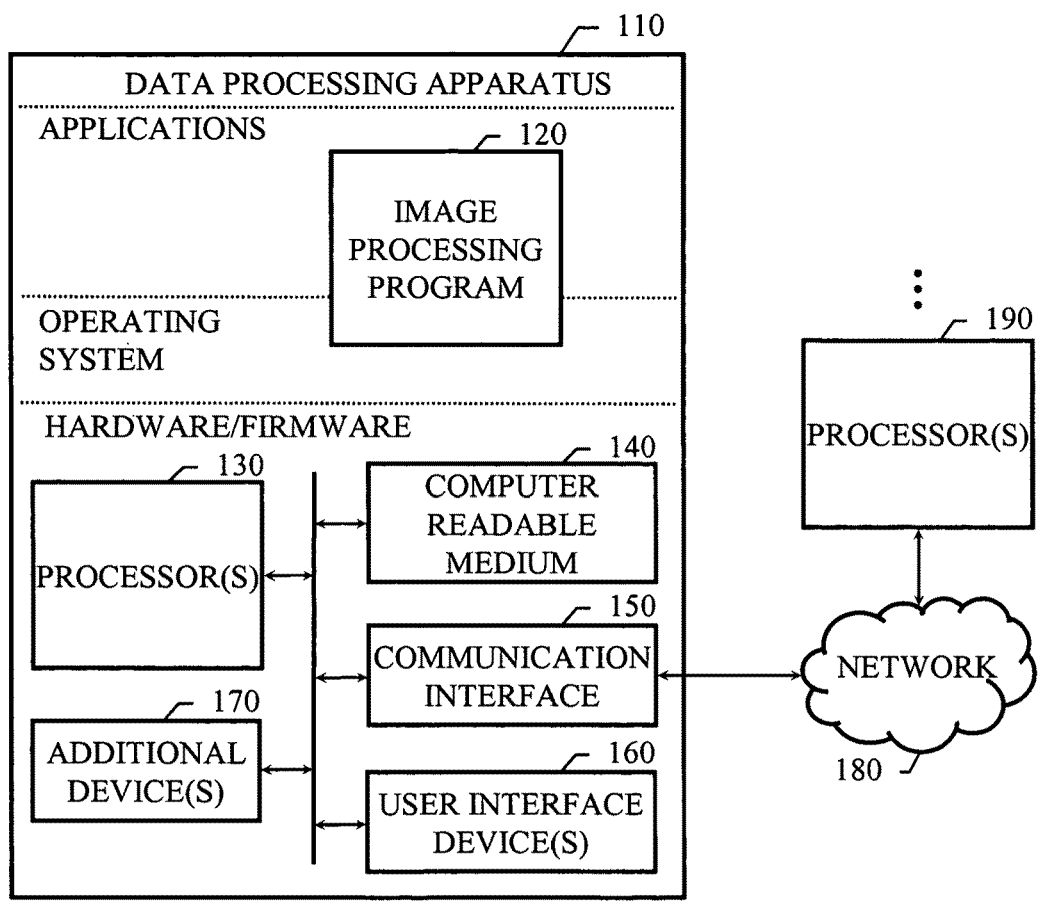
FIG. 1 shows an example system programmed to select a reference image, for images to be joined together in accordance with projective transformations, based on a measure of overall distortion for the images.

FIG. 1 shows an example system programmed to select a reference image, for images to be joined together in accordance with projective transformations, based on a measure of overall distortion for the images. A data processing apparatus 110 can include hardware/firmware, an operating system and one or more programs, including image processing program 120. The image processing program 120 operates, in conjunction with the data processing apparatus 110, to effect various operations described in this specification. Thus, the program 120, in combination with processor(s) and computer-readable media (e.g., memory), represents one or more structural components in the system.

The image processing program 120 can be an image processing application, or a portion thereof. As used herein, an application refers to a computer program that the user perceives as a distinct computer tool used for a defined purpose. An application can be built entirely into the operating system (OS) of the data processing apparatus 110, or an application can have different components located in different locations (e.g., one portion in the OS or kernel mode, one portion in the user mode, and one portion in a remote server), and an application can be built on a runtime library serving as a software platform of the apparatus 110. Moreover, an application can be a graphical user interface application (e.g., a Web browser) that connects to one or more processors 190 (e.g., one or more Web servers) over a network 180 and provides the computer tool as a network service.

The image processing program 120 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing program 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 110 includes one or more processors 130 and at least one computer-readable medium 140 (e.g., random access memory, storage device, etc.). The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing program 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once programmed, the data processing apparatus 110 is operable to select a reference image, for images to be joined together in accordance with projective transformations, based on a measure of overall distortion for the images. In this process, one of the images is set as the reference image and therefore does not undergo any projective distortion, aside from any specified group transform (e.g., translation and rotation) applicable to all the images. The selected image is often the most interesting one in the set of images, and setting this image to be the reference image removes all the projective distortions of this image (or minimizes such distortions when a transform is specified for the entire group of images).

Figure 2:
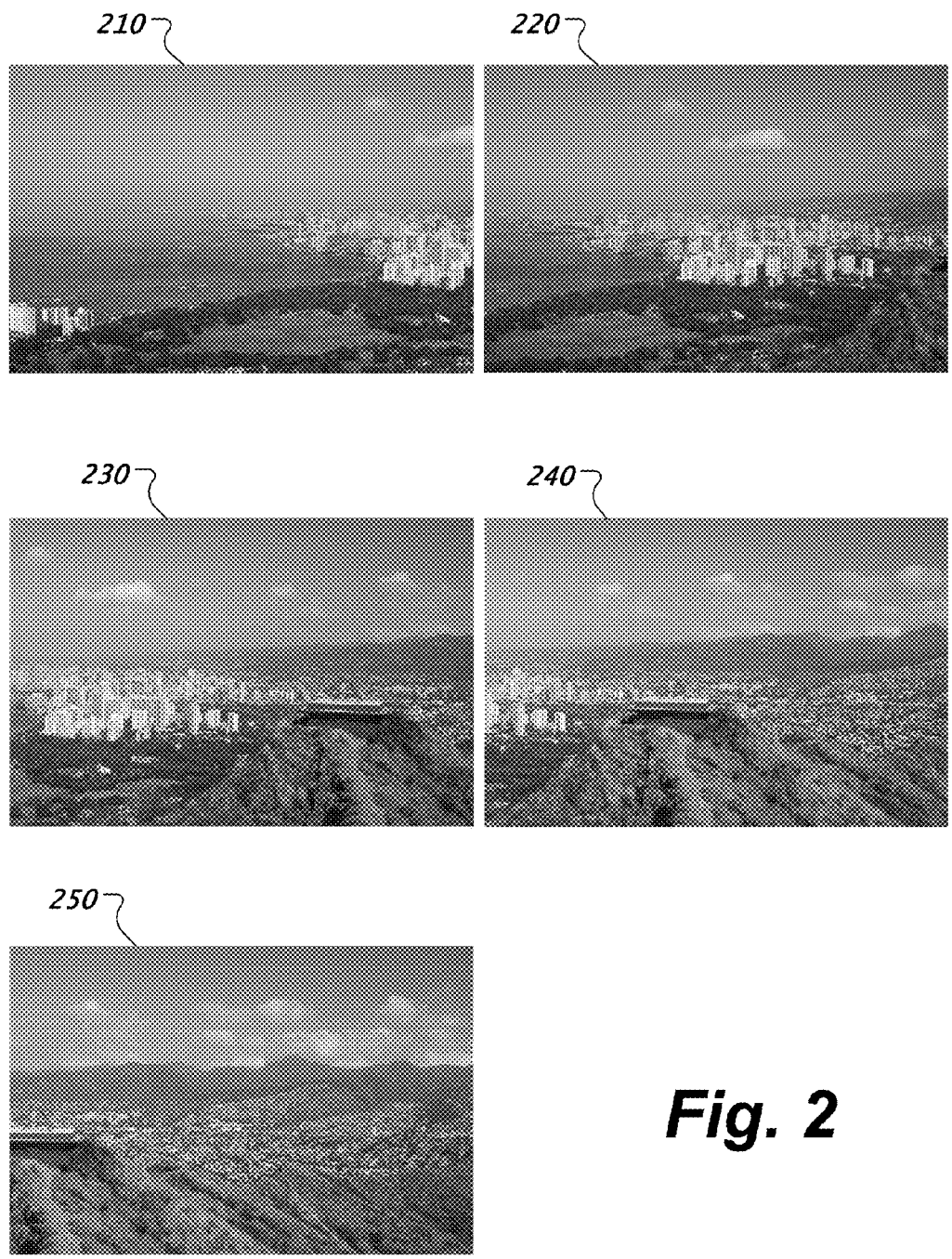
FIG. 2 shows example images to be joined together.

FIG. 2 shows example images to be joined together. A first image 210 shows a left most portion of a panoramic view. A second image 220 shows a next portion of the panoramic view. A third image 230 shows a middle portion of the panoramic view. A fourth image 240 shows a next portion of the panoramic view. A fifth image 250 shows a right most portion of the panoramic view.

Figure 3:
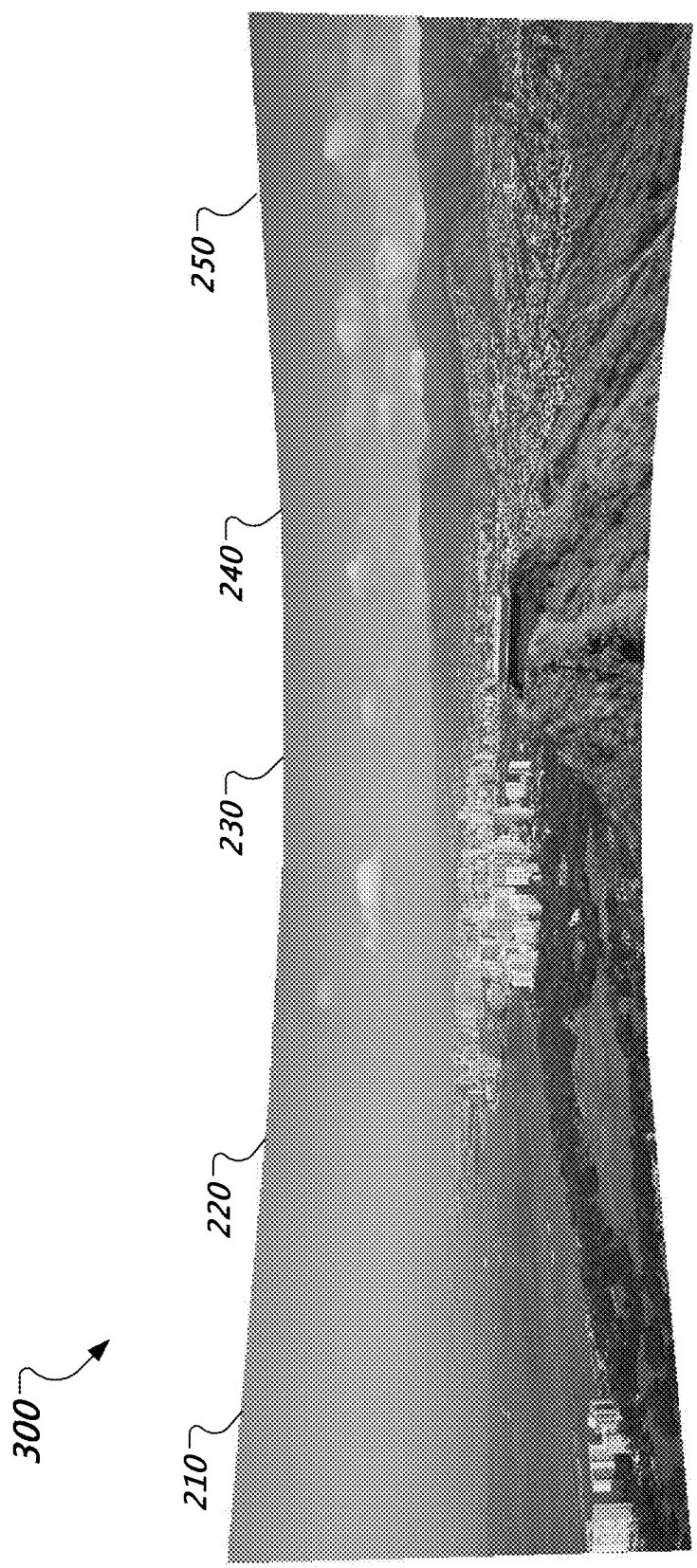
FIG. 3 shows the example images from FIG. 2 after being joined together in accordance with projective transformations to form a composite image.

FIG. 3 shows the example images from FIG. 2 after being joined together in accordance with projective transformations to form a composite image 300. As shown, the middle image 230 has been used as the reference image for the group of images, and its projective transform has been set to identity. As will be appreciated; many more complicated sets of images can be stitched and joined together using the systems and techniques described herein, and the images 210-300 are only shown as one example. Moreover, a group transform can also be specified for all the images, and thus, the reference image 230 need not have its projective transform set to the identity transform.

Figure 4:
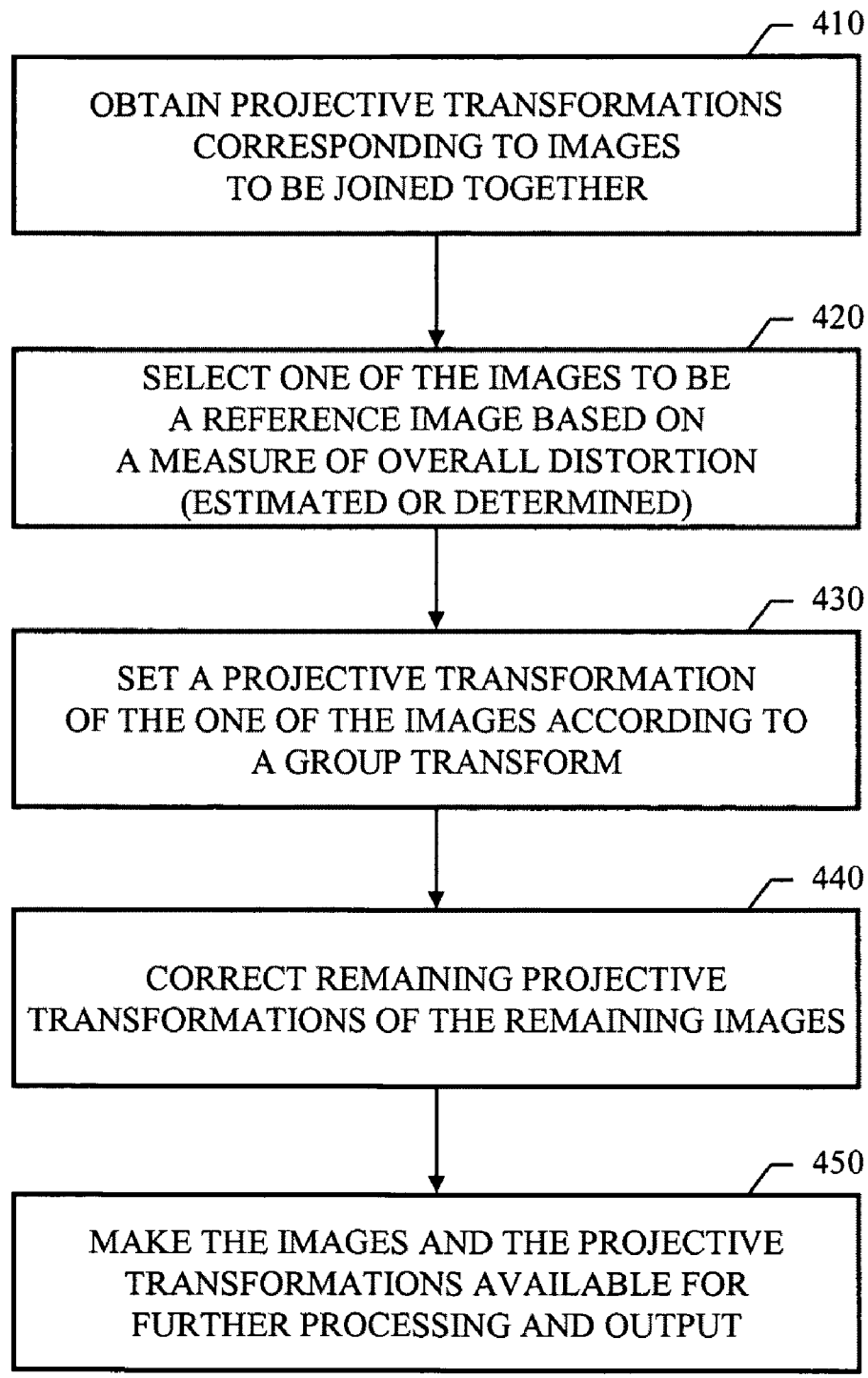
FIG. 4 is a flow chart showing an example process of selecting and using a reference image for images to be joined together in accordance with projective transformations.

FIG. 4 is a flow chart showing an example process of selecting and using a reference image for images to be joined together in accordance with projective transformations. Projective transformations are obtained 410, where the projective transformations correspond to images to be joined together in accordance with the projective transformations. This can involve receiving the projective transformations from an image alignment and/or stitching tool that provides a set of projective transformations for a set of images. The images can be previously loaded, or be received at the same time. Moreover, the image alignment and/or stitching tool can also provide a relational, undirected graph for the projective transformations and the images, such as described further below.

Alternatively, obtaining the projective transformations can involve generating the projective transformations based on a set of images using known techniques. The images can be stitched together using feature based image stitching or intensity based image stitching techniques. For example, feature based image stitching can be performed as described in M. Brown and D. G. Lowe, "Recognizing Panoramas", Proceedings of the 9th International Conference on Computer Vision (ICCV2003), pages 1218-1225, Nice, France, October 2003. Intensity based image stitching can be performed as described in R. Szeliski and H.-Y. Shum, "Creating full view panoramic image mosaics and texture-mapped models", Computer Graphics (SIGGRAPH'97 Proceedings), pages 251-258, August 1997.

Regardless of whether the projective transformations are generated or received, the projective transformations are defined with respect to a reference frame, which can be fixed to one of the images (i.e., a reference image) or independent of any specific image. When the reference frame is one of the images, this reference image also has a projective transform, which is the identity transformation.

One of the images is selected 420 to be a reference image for remaining ones of the images, and this selection is based on a measure of overall distortion for the images. In general, the objective of this selection is to find a reference image that causes the final composition to be visually pleasant. Thus, the selection can be designed to minimize the measure of overall distortion for the images resulting from the selection of the reference image. The measure of overall distortion can be an implicit result of estimating an appropriate reference image, which approximates finding a minimum overall distortion, such as described below in connection with FIGS. 5A and 5B.

Alternatively, the measure of overall distortion can be determined based on calculations of resulting distortion, such as described below in connection with FIGS. 6, 7A and 7B. In addition, any user input regarding the selection of the reference image can also be respected during this selection, such as described further below in connection with FIGS. 8-10.

Once one of the images has been selected as the reference, a projective transformation of this image can be set 430 according to any specified group transform. When such a transform is present, the specified transform affects all of the images in the set, and thus, even the reference image will undergo a transformation in accordance with the specified group transform. The group transform can be specified by a user or by an automatic process (e.g., when the resulting composite image is to placed within an existing layout that specifies the transform). In the event that there is no specified group transform, the projective transformation of the reference image is set to identity (i.e., the group transform is the identity transform).

Remaining projective transformations of the remaining images can be corrected 440 in accordance with the setting of the projective transformation of the one of the images used as the reference image. This can be done in a variety of manners. For example, letting $P_i$ and $P_j$ be the original projective transformations for the new reference image and a remaining image, respectively, the following transform can be computed:

$$dP_{ij} = *P_j * P_i^{-1}, \text{where } P_i^{-1} \text{ is the inverse of } P_i.$$

Letting be the new projective transformation of the new reference image, then the new projective transformation for the remaining image, $Q_j$, can be computed as follow:

$$Q_j = dP_{ij} * Q_i.$$

Note that this can guarantee $dQ_{ij} = *Q_j * Q_i^{-1} = dP_{ij}$, and the new projective transformations are in accordance with the original ones.

The images and the projective transformations can then be made available 450 for further processing and output. This can involve saving the images and projective transformations to a computer-readable medium, presenting the images (with the projective transformations applied) to a user in a user interface, printing the images (with the projective transformations applied) to a printing device, or sending the images and projective transformations to another program or remote device.

Figure 5A:
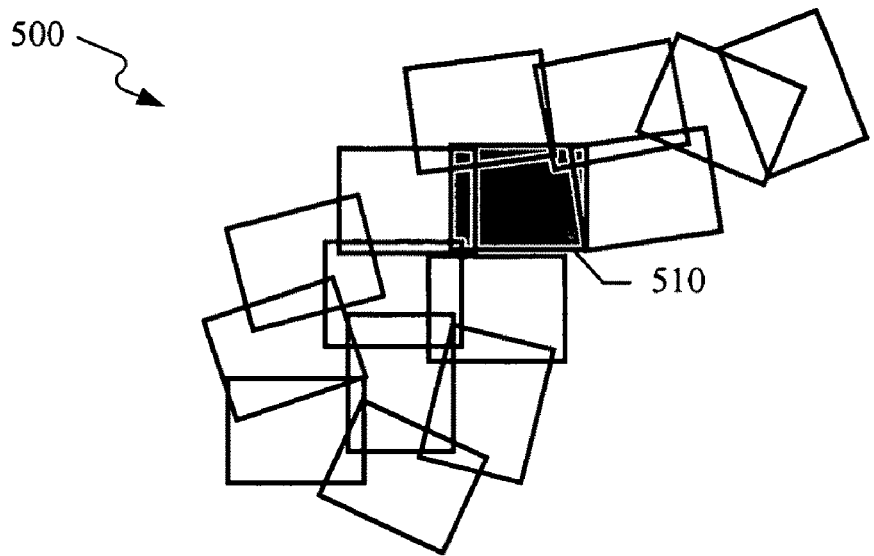
FIG. 5A is a diagram showing an example set of overlapping images for which an appropriate reference image is estimated.

FIG. 5A is a diagram showing an example set of overlapping images 500 for which an appropriate reference image 510 is estimated. Rather than computing the actual distortions that result from a given image being selected as the reference image, these distortions can be quickly estimated (either implicitly or explicitly) using various techniques. Estimating which of the images 500 minimizes the measure of overall distortion when used as the reference image can be done using a simplified representation of the images 500, such as an undirected graph. The simplified representation can indicate the images that overlap with each other, and an image 510 with a minimum maximal distance to overlapping images in the images 500 can be found.

The distance between two overlapping images can be fixed (e.g., immediately overlapping images having a pre-defined distance between each other of one), or the distance can vary with an estimated distortion between the two images (e.g., the distance can be defined based on the transformations between images). In the case of a graph representation, the relative distance between two immediately overlapping images can be stored as the edge weight, which can be set to one for all edges. Thus, the distance measure can serve as a measure of distortion, even when the distance measure does not exactly correspond to the actual resulting distortion.

Moreover, the distance between two images (e.g., the edge weight) can be determined using various techniques. For example, this distance measure can be computed as $$\log(\text{Distance}(i,j))$$

where Distance (i, j) is the sum of the distortion for image j (when image i is set as the reference image) and the distortion for image i (when image j is set as the reference image). These individual image distortions can be determined using the enclosing areas techniques described below.

In general, the maximal distance to overlapping images (i.e., images that can be reached through a series of immediately overlapping images), for a given image being selected as the reference image, is the largest distance measured from the given image to all other images in the set. For the example shown in FIG. 5A, if the distance measure between each two immediately overlapping images is fixed at one, the image 510 has a maximal distance of three, whereas all remaining images in the set 500 have maximal distances of four or greater (note that the image 510 has been shaded in FIG. 5A merely to make it more readily identifiable to the reader of this application). Thus, the image 510 has the minimum maximal distance to overlapping images in the set 500.

Figure 5B:
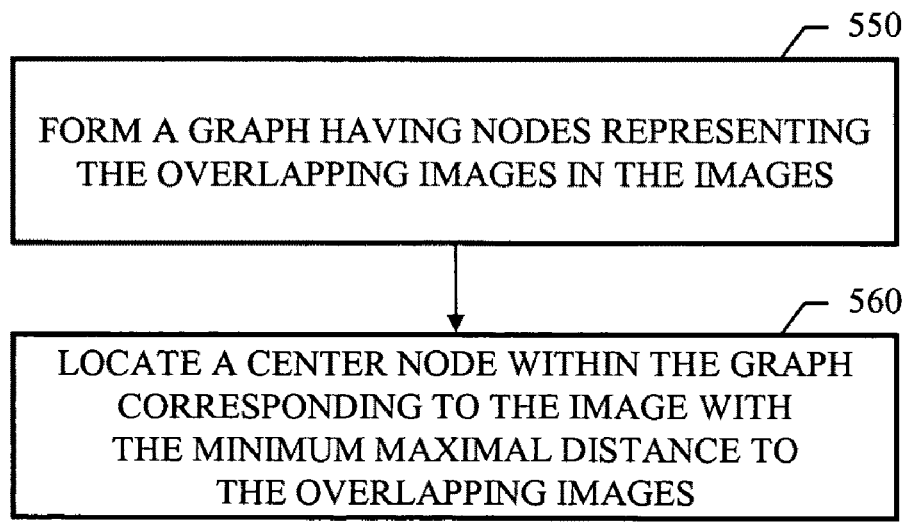
FIG. 5B is a flow chart showing an example process of finding an image with a minimum maximal distance to overlapping images in a set of images in order to estimate which image minimizes a measure of overall distortion.

FIG. 5B is a flow chart showing an example process of finding an image with a minimum maximal distance to overlapping images in a set of images. A graph having nodes can be formed 550, where the graph represents the overlapping images in the set of images. Images can be connected if any image is overlapping at least one of the other images. This can be done for various subsets of the images as well, if the set of images includes at least two images that cannot be connected through a series of immediately overlapping images. For each connected subset of images, an undirected graph can be formed by treating each image as one node, and forming an edge between any two nodes if the two corresponding images immediately overlap each other. Furthermore, in the case of using fixed distances, all edges can be assigned a weight of one.

A center node within the graph can be located 560, where the center node corresponds to the image in the set with the minimum maximal distance to the overlapping images in the set of images. The graph can be processed to find all-pairs shortest paths (e.g., with Johnson's algorithm or the Floyd-Warshall algorithm). Using the all-pairs shortest paths, the maximal distance for each image to all other images can be computed. The image having the minimum maximal distance can then be selected as the reference image for the set. If more than one image has the same minimum maximal distance, any of these images can be used as the reference image; if desired, further calculations of likely distortion can be carried out in such case to distinguish between the multiple images having the same minimum maximal distance. Other approaches are also possible here for finding the center node, such as finding the node with the minimum average distance to all other nodes. In general, the image with the most connections to other images is often a preferred reference image.

Figure 6:
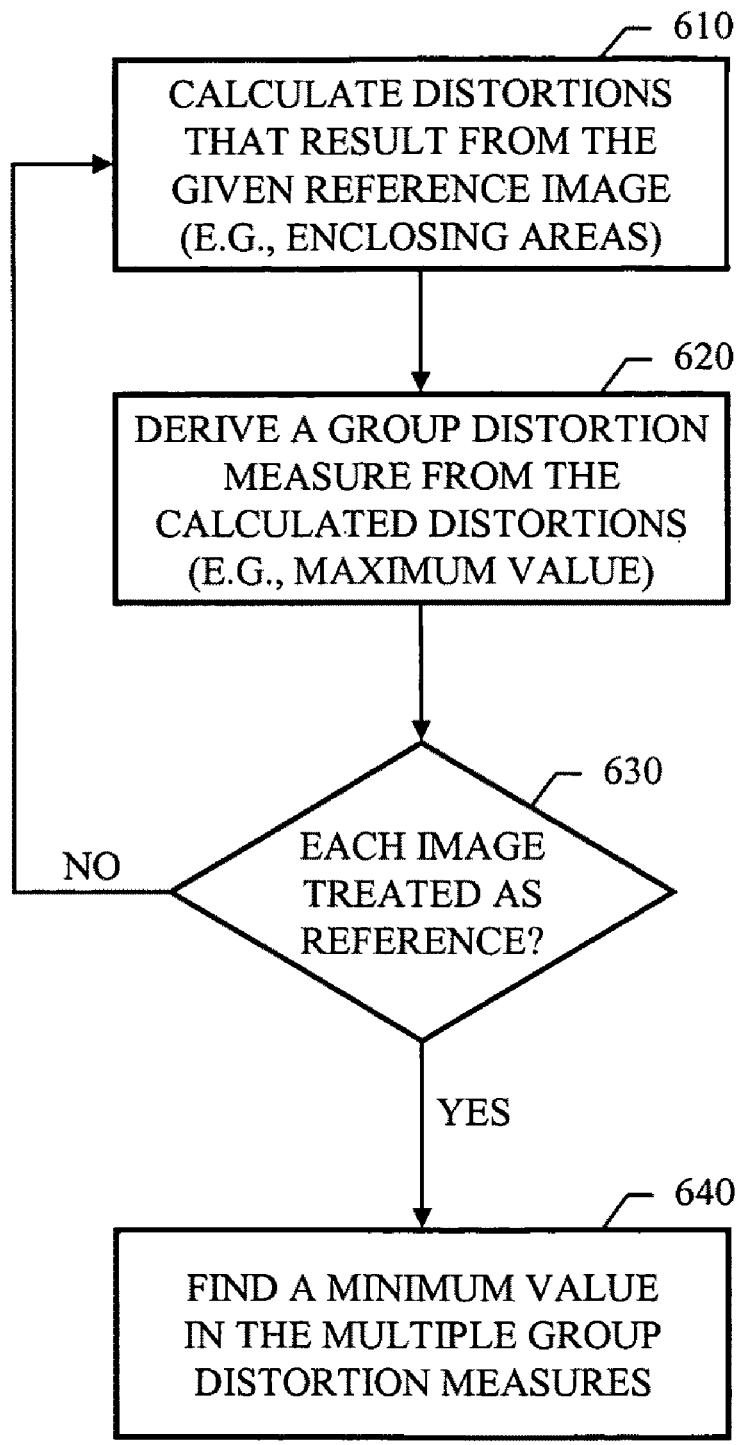
FIG. 6 is a flow chart showing an example process of determining an optimal reference image in a set of images.

FIG. 6 is a flow chart showing an example process of determining an optimal reference image in a set of images. Rather than using a measure of overall distortion that is an estimate of distortion, full distortion calculations can be performed, and an optimal reference image can be determined based on these. As used herein, the term "optimal" means desirable in the sense of minimizing overall distortion in light of a selected measure of distortion, and need not be optimal in an absolute sense.

Each image in the set of images can be treated in turn as a given reference image. For each given reference image, distortions for remaining ones of the images can be calculated 610. A current given image can have its projective transformation set to identity (or based on any specified transform), and the remaining projective transformations can be corrected accordingly, such as described above. The resulting distortions for the remaining images can then be calculated based on the corrected projective transformations, such as by calculating enclosing areas, which is described below in connection with FIGS. 7A and 7B. It should be noted that these calculations can be performed without fully applying the corrected projective transformations to the images, since only a subset of points (e.g., the four corners of an image) need be used to determine the distortion resulting from applying a particular projective transformation to a particular image.

A group distortion measure can be derived 620 from the calculated distortions. For example, the group distortion measure can be set equal to the maximum distortion (of any image in the set) resulting from a given selection of a reference image. Alternatively, the group distortion measure can depend on more than just one image in the set. The median or mean distortion value for the images in the set can be used as the group distortion measure. Other combinations of individual image distortions are also possible, such as taking the average distortion of the two most distorted images in the set of images.

The calculating 610 and deriving 620 can be repeated until each image has been treated 630 as a potential reference image. Once each image has been so considered, multiple group distortion measures have been thereby obtained, and a minimum value can be found 640 in the multiple group distortion measures. This minimum value corresponds to the optimal reference image for the set of images.

Figure 7A:
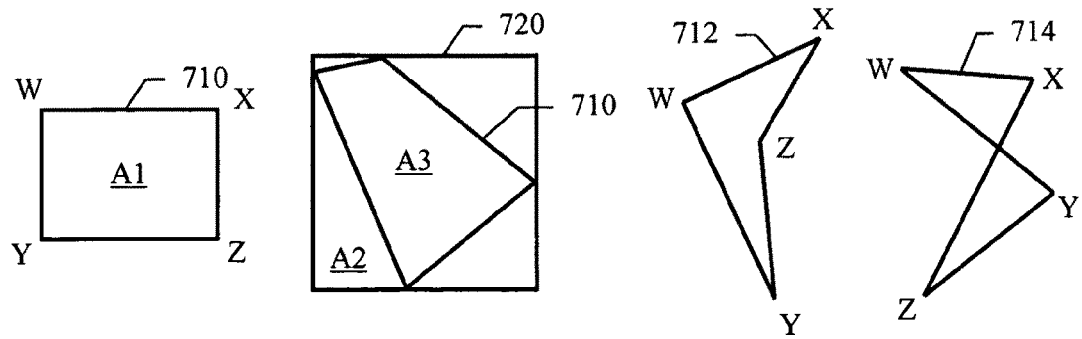
FIGS. 7A and 7B are a block diagram and a flow chart showing example processes of calculating distortion of a current image based on enclosing areas of the current image both before and after application of a current projective transformation.
Figure 7B:
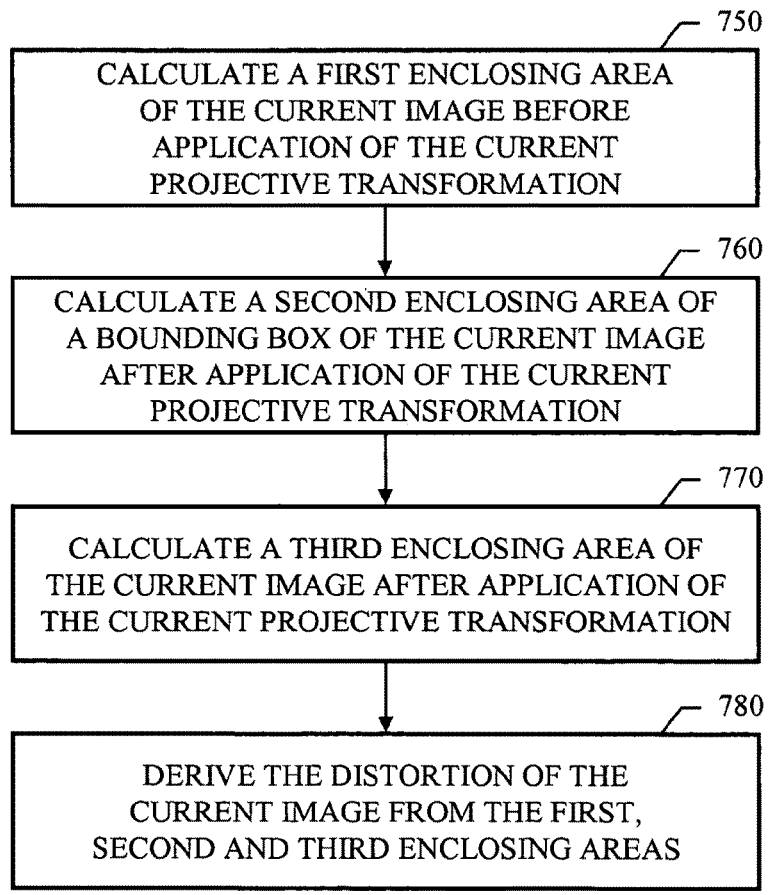

FIGS. 7A and 7B are a block diagram and a flow chart showing example processes of calculating distortion of a current image based on enclosing areas of the current image both before and after application of a current projective transformation. A first enclosing area A1 of an image 710 (before application of a projective transformation) can be calculated 750. For an undistorted, rectangular image, this enclosing area is the same as that of the bounding box for this image.

A second enclosing area A2 of a bounding box 720 of the current image 710 (after application of a projective transformation) can be calculated 760, and a third enclosing area A3 of the current image 710 (after application of the projective transformation) can be calculated 770. From the first, second and third enclosing areas, a distortion of the image 710 (resulting from the projective transformation) can be derived 780. For example, the distortion (D) of the image 710 can be defined as follows:

If $(A1 > A2), R1 = A1/A2$; otherwise $R1 = A2/A1$.

If $(A1 > A3), R2 = A1/A3$; otherwise $R2 = A3/A1$.

$D = \max(R1, R2)$.

Other distortion calculations are also possible. For example, from the projective transformation, the ratio between the enclosing area of the final bounding box and the enclosing area of the initial bounding box can be used. Moreover, the numbers found in the projective transformation can be processed directly (without application to a subset of image points) to determine a measure of the distortion resulting from application of the projective transformation.

In addition, if application of the projective transformation to the current image 710 will result in either a concave quadrilateral (e.g., concave quadrilateral 712) or a crossed quadrilateral (e.g., crossed quadrilateral 714), this can be detected initially and further processing using the current reference image can be terminated, since a reference image choice that results in such distortions can be presumed undesirable and therefore be rejected. To check for the crossed quadrilateral case (if W, X, Y, Z are the corners of the original image) a check can be made to see if line segments WX and YZ intersect or if line segments WY and XZ intersect after the transform. To check for the concave quadrilateral case (if W, X, Y, Z are the corners of the original image) a check can be made of the four inner angles WXZ, XZY, ZYW, YWX to see if any of these angles are larger than 180 degrees. In general, the check for a concave quadrilateral should be done after the check for a crossed quadrilateral.

Figure 8:
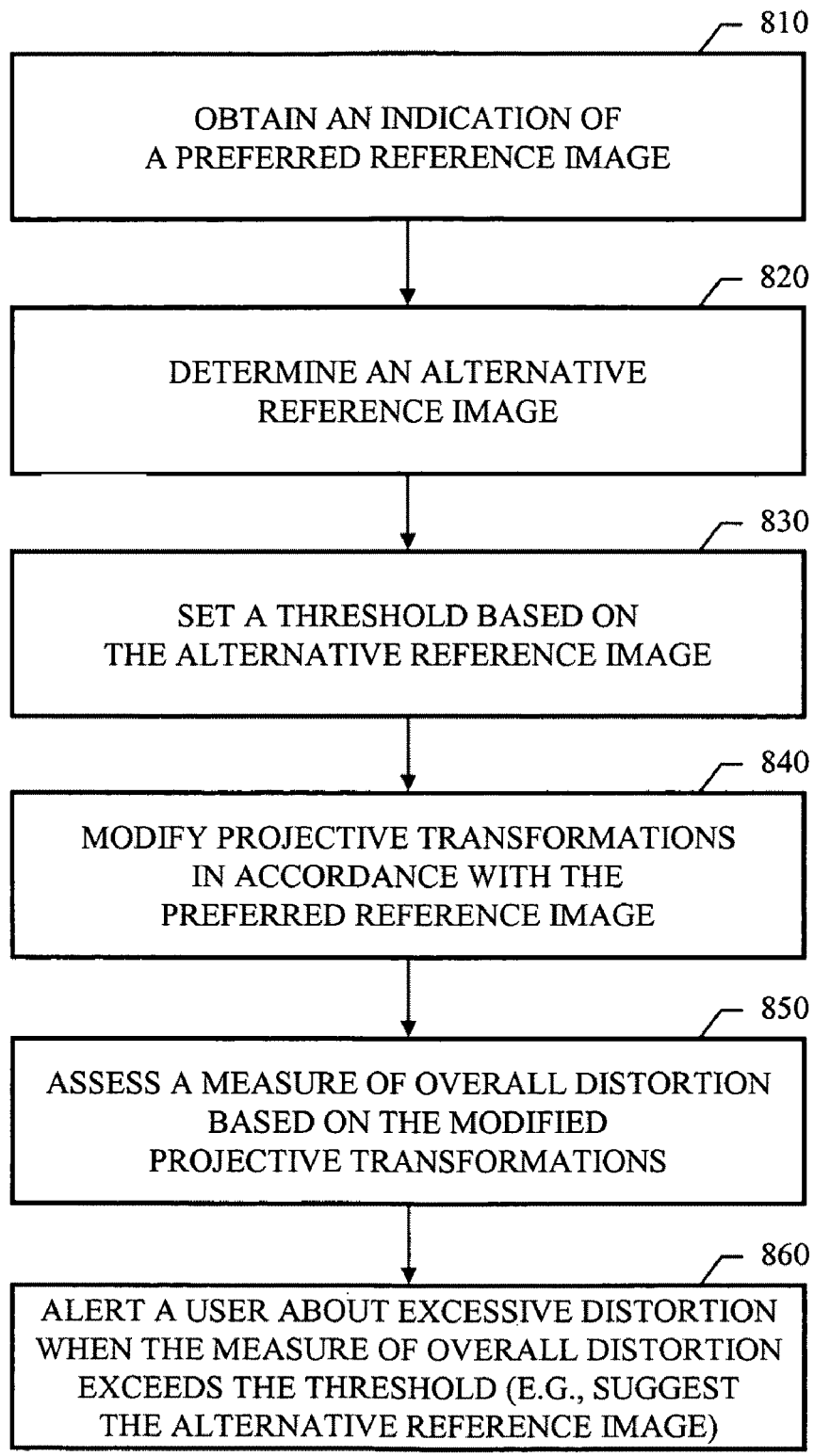
FIG. 8 is a flow chart showing an example process of assessing a preferred reference image.

In some implementations, a preferred reference image can be specified separate from the automatic selection of a reference image described above. FIG. 8 is a flow chart showing an example process of assessing a preferred reference image. An indication of a preferred reference image can be obtained 810, either separate from or along with the images. This indication can be user specified, such as active user selection of a reference image through a graphical user interface, or the indication can be automatically generated, such as a previous selection of a reference image by an automatic image alignment and/or stitching tool. An alternative reference image can be determined 820, such as by using any of the techniques described above. Note that the determined alternative reference image may be the same as the indicated preferred reference image, in which case, no further assessment of the preferred reference image need be performed, and the process can end.

Figure 9:
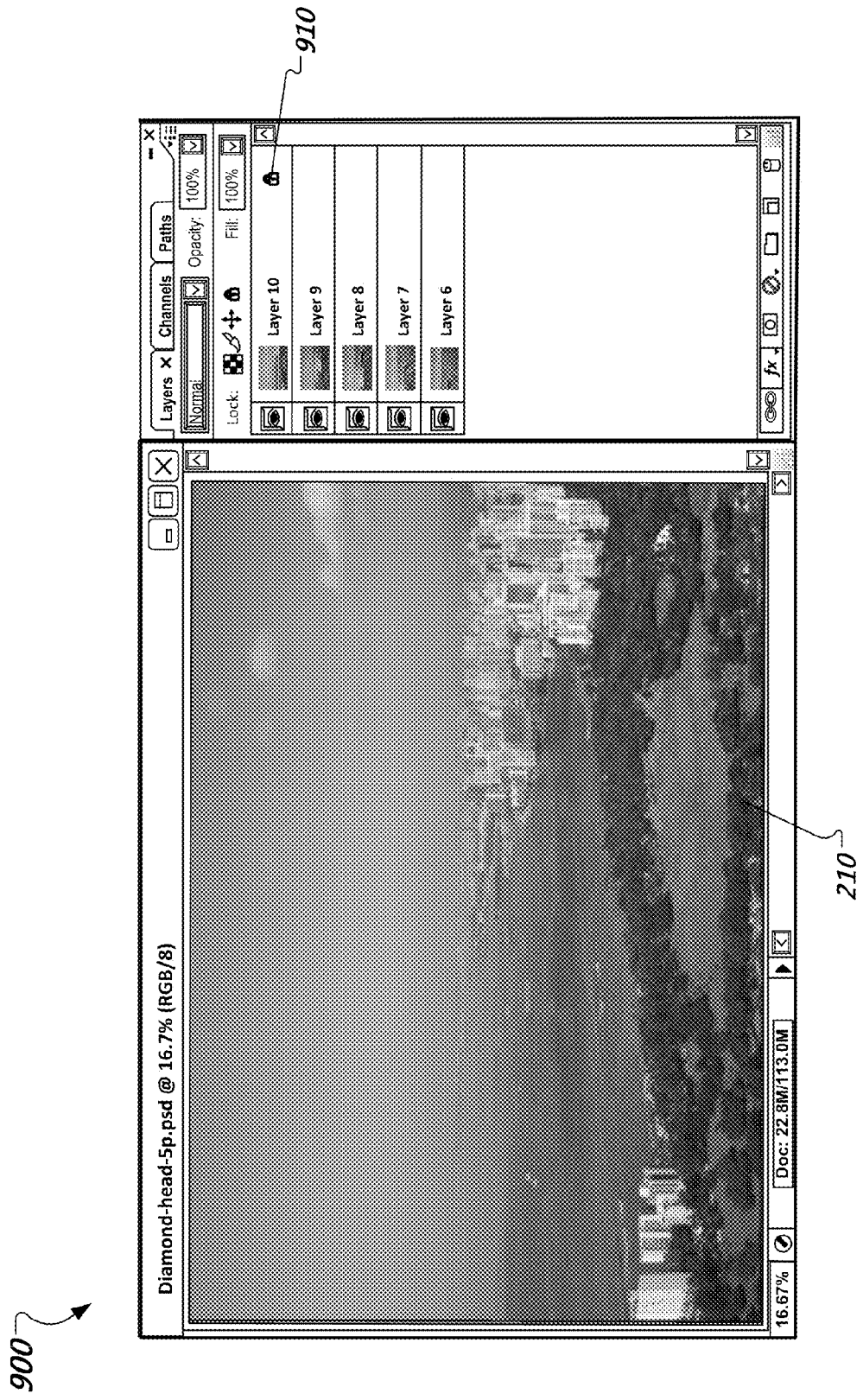
FIG. 9 shows an example user interface through which the example images from FIG. 2 can be joined together in accordance with projective transformations.

FIG. 9 shows an example user interface 900 through which the example images from FIG. 2 can be joined together in accordance with projective transformations. In this example, the images 210-250 are arranged in separate layers of a single image file. A lock icon 910 shows that the layer corresponding to image 210 (which is shown in the main view of the user interface 900) has been locked by the user, thereby indicating that this image is the preferred reference image. The user interface 900 is only one example; there are many different approaches to designing a user interface that allows a user to interact with the images and specify a preferred reference image, as will be readily apparent to those skilled in the art.

Figure 10:
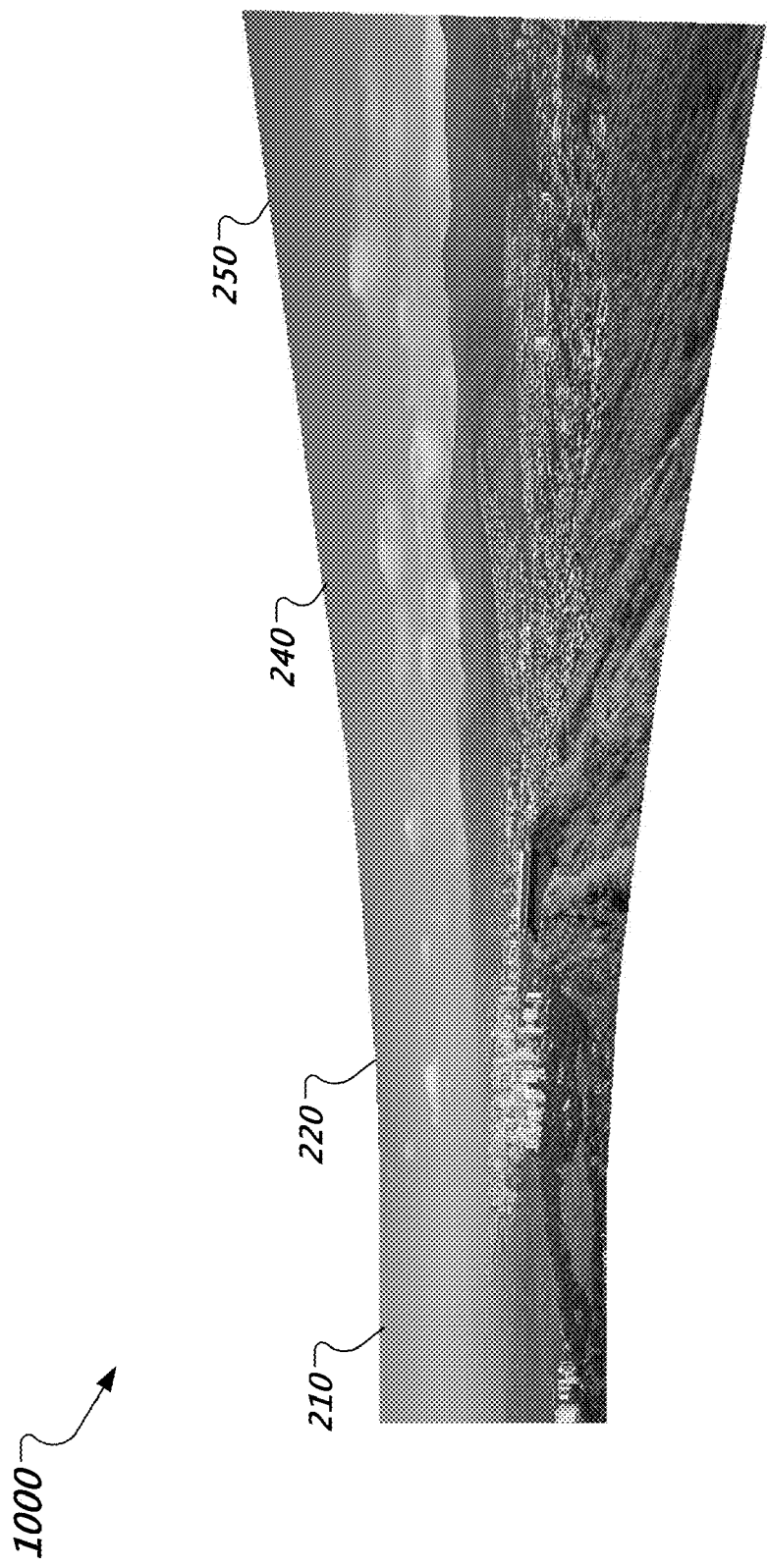
FIG. 10 shows the example images from FIG. 2 after being joined together in accordance with projective transformations and a user specified reference image to form a composite image.

FIG. 10 shows the example images from FIG. 2 after being joined together in accordance with projective transformations and a user specified reference image to form a composite image 1000. As shown by a comparison of FIG. 10 with FIG. 3, the choice of the reference image affects the appearance of the final composition. When the left-most image 210 is chosen to be the reference, the right-most image 250 has significant resulting distortion.

Referring again to FIG. 8, when the alternative reference image is different than the preferred reference image, a threshold (for use in assessing the preferred image) can be set 830 based on the alternative reference image. For example, the threshold can be set equal to 1.05, 1.1, 1.15, or 1.2 times the group distortion measure resulting from use of the alternative reference image. Alternatively, the threshold can be a fixed number (e.g., sixteen, when the group distortion measure constitutes the maximal distance measured using unitary edge weights, as described above), or the threshold can vary based on other factors (e.g., the threshold can be a function of the number of images in the set).

The projective transformations of the images can be modified 840 in accordance with the preferred reference image, such as described above. A measure of overall distortion can be assessed 850 based on the modified projective transformations, such as by using the techniques described above. Note that, when the threshold depends on the measure of overall distortion obtained for the alternative reference image, the measure of overall distortion assessed for the preferred reference image should be obtained in the same manner as done for the alternative reference image.

A user can be alerted 860 regarding excessive distortion in the images when the measure of overall distortion for the images, in view of the modified projective transformations, exceeds the threshold. This can involve suggesting the alternative reference image, so the user may opt to use that image as the reference, rather than the previously indicated image. Moreover, the alerting can involve visual and/or aural warning signals, and the alerting can include multiple levels of warning, depending on the extent of resulting distortion and the amount of distortion that is likely acceptable in the current workflow. In the end, however, the user can decide to proceed with the preferred reference image, even if excessive distortion results. Thus, the finally selected reference image can be either the automatically determined image or a user specified one.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The alternative reference image can also be compared with a threshold; for example, initially the alternative reference image can be found using the center of the graph technique described, and if this image does not satisfy the threshold, a new alternative reference image can be found using a different technique.

What is claimed is:

1. A method comprising:
   obtaining projective transformations corresponding to images to be joined together;
   calculating, by a computer including at least one processor and at least one memory device, distortion information based on data corresponding to the images;
   selecting, based on the calculated distortion information, one of the images to be a reference image for remaining ones of the images;
   setting a projective transformation of the reference image according to a group transform;
   correcting remaining projective transformations of the remaining images in accordance with the setting the projective transformation of the reference image; and
   making the images and the corrected remaining projective transformations available for further processing and output.

2. The method of claim 1, wherein the calculating comprises:
   using a graph representation of the images that overlap as the data; and
   determining the distortion information in accordance with edge weights assigned to nodes of the graph.

3. The method of claim 2, comprising:
   assigning the edge weights based on distortion values calculated for the images.

4. The method of claim 2, wherein the edges are all assigned an identical weight.

5. The method of claim 1, wherein the calculating comprises:
   calculating, for each of multiple ones of the images, distortions for each of multiple other ones of the images; and
   deriving a group distortion value from the calculated distortions for each of the multiple ones of the images to obtain multiple group distortion values.

6. The method of claim 5, wherein calculating the distortions comprises:
   setting a projective transformation of a given image of the multiple ones of the images based on a specified transform;
   generating corrected projective transformation for each of the multiple other ones of the images that are different from the given image; and
   partially applying the generated corrected projective transformation to calculate resulting distortions for each of the multiple other ones of the images that are different from the given image.

7. The method of claim 5, wherein calculating the distortions comprises:
   calculating multiple enclosing areas for a current image; and
   deriving a distortion value for the current image based on the multiple enclosing areas.

8. The method of claim 5, wherein the deriving comprises combining multiples ones of the calculated distortions.

9. The method of claim 1, wherein the selecting comprises:
   obtaining an indication of a preferred image for use as the reference image;
   using the preferred image as the reference image if this image is equivalent to an image indicated by the calculated distortion information; and else
   proposing an alternative image to be the reference image in accordance with the calculated distortion information.

10. The method of claim 9, wherein the preferred image is equivalent to the image indicated by the calculated distortion information when a difference between distortion resulting from use of the preferred image as compared to use of the image indicated by the calculated distortion information fails to exceed a threshold.

11. A nontransitory computer-readable medium encoding a program operable to cause data processing apparatus to perform operations comprising:
   obtaining projective transformations corresponding to images to be joined together;
   calculating distortion information based on data corresponding to the images;
   selecting, based on the calculated distortion information, one of the images to be a reference image for remaining ones of the images;
   setting a projective transformation of the reference image according to a group transform;
   correcting remaining projective transformations of the remaining images in accordance with the setting the projective transformation of the reference image; and
   making the images and the corrected remaining projective transformations available for further processing and output.

12. The computer-readable medium of claim 11, wherein the calculating comprises:
   using a graph representation of the images that overlap as the data; and determining the distortion information in accordance with edge weights assigned to nodes of the graph.

13. The computer-readable medium of claim 12, the operations comprising:
assigning the edge weights based on distortion values calculated for the images.

14. The computer-readable medium of claim 12, wherein the edges are all assigned an identical weight.

15. The computer-readable medium of claim 11, wherein the calculating comprises:
calculating, for each of multiple ones of the images, distortions for each of multiple other ones of the images; and
deriving a group distortion value from the calculated distortions for each of the multiple ones of the images to obtain multiple group distortion values.

16. The computer-readable medium of claim 15, wherein calculating the distortions comprises:
setting a projective transformation of a given image of the multiple ones of the images based on a specified transform;
generating corrected projective transformation for each of the multiple other ones of the images that are different from the given image; and
partially applying the generated corrected projective transformation to calculate resulting distortions for each of the multiple other ones of the images that are different from the given image.

17. The computer-readable medium of claim 15, wherein calculating the distortions comprises:
calculating multiple enclosing areas for a current image; and
deriving a distortion value for the current image based on the multiple enclosing areas.

18. The computer-readable medium of claim 15, wherein the deriving comprises combining multiples ones of the calculated distortions.

19. The computer-readable medium of claim 11, wherein the selecting comprises:
obtaining an indication of a preferred image for use as the reference image;
using the preferred image as the reference image if this image is equivalent to an image indicated by the calculated distortion information; and else
proposing an alternative image to be the reference image in accordance with the calculated distortion information.

20. The computer-readable medium of claim 19, wherein the preferred image is equivalent to the image indicated by the calculated distortion information when a difference between distortion resulting from use of the preferred image as compared to use of the image indicated by the calculated distortion information fails to exceed a threshold.

21. A system comprising:
a user interface device; and
one or more computers communicatively coupled with the user interface device and programmed to perform operations comprising:
obtaining projective transformations corresponding to images to be joined together;
calculating distortion information based on data corresponding to the images;
selecting, based on the calculated distortion information, one of the images to be a reference image for remaining ones of the images;
setting a projective transformation of the reference image according to a group transform;
correcting remaining projective transformations of the remaining images in accordance with the setting the projective transformation of the reference image; and
making the images and the corrected remaining projective transformations available for further processing and output.

22. The system of claim 21, wherein the calculating comprises:
using a graph representation of the images that overlap as the data; and
determining the distortion information in accordance with edge weights assigned to nodes of the graph.

23. The system of claim 22, the operations comprising:
assigning the edge weights based on distortion values calculated for the images.

24. The system of claim 22, wherein the edges are all assigned an identical weight.

25. The system of claim 21, wherein the calculating comprises:
calculating, for each of multiple ones of the images, distortions for each of multiple other ones of the images; and
deriving a group distortion value from the calculated distortions for each of the multiple ones of the images to obtain multiple group distortion values.

26. The system of claim 25, wherein calculating the distortions comprises:
setting a projective transformation of a given image of the multiple ones of the images based on a specified transform;
generating corrected projective transformation for each of the multiple other ones of the images that are different from the given image; and
partially applying the generated corrected projective transformation to calculate resulting distortions for each of the multiple other ones of the images that are different from the given image.

27. The system of claim 25, wherein calculating the distortions comprises:
calculating multiple enclosing areas for a current image; and
deriving a distortion value for the current image based on the multiple enclosing areas.

28. The system of claim 25, wherein the deriving comprises combining multiples ones of the calculated distortions.

29. The system of claim 25, wherein the selecting comprises:
obtaining an indication of a preferred image for use as the reference image;
using the preferred image as the reference image if this image is equivalent to an image indicated by the calculated distortion information; and else
proposing an alternative image to be the reference image in accordance with the calculated distortion information.

30. The system of claim 29, wherein the preferred image is equivalent to the image indicated by the calculated distortion information when a difference between distortion resulting from use of the preferred image as compared to use of the image indicated by the calculated distortion information fails to exceed a threshold.

31. The system of claim 21, comprising a mobile device comprising the user interface device and the one or more computers.

* * * * *

UNITED STATES PATENT AND TRADEMARK OFFICE
CERTIFICATE OF CORRECTION

PATENT NO. : 8,224,119 B2
APPLICATION NO. : 13/198636
DATED : July 17, 2012
INVENTOR(S) : Hailin Jin and Jen-Chan Chien It is certified that error appears in the above-identified patent and that said Letters Patent is hereby corrected as shown below:

In the Claims:

In column 16, line 46 (line 1 of claim 29) of the printed patent, please delete "claim 25" and insert --claim 21-- therefor.

Signed and Sealed this
Eighteenth Day of September, 2012

David J. Kappos
*Director of the United States Patent and Trademark Office*